US012811299B2

(12) United States Patent
Deng et al.

(10) Patent No.: US 12,811,299 B2
(45) Date of Patent: Nov. 24, 2026

(54) ANTENNA AND BASE STATION

(71) Applicant: HUAWEI TECHNOLOGIES CO., LTD., Shenzhen (CN)

(72) Inventors: Liangyong Deng, Dongguan (CN); Wen Duan, Shenzhen (CN); Dantao Cai, Dongguan (CN); Weihong Xiao, Dongguan (CN); Rui Jin, Weilheim (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 18/961,843

(22) Filed: Nov. 27, 2024

(65) Prior Publication Data

US 2025/0096472 A1 Mar. 20, 2025

Related U.S. Application Data

(63) Continuation of application No. PCT/CN2023/094153, filed on May 15, 2023.

(30) Foreign Application Priority Data

May 30, 2022 (CN) ......................... 202210604355.6

(51) Int. Cl.
*H01Q 9/04* (2006.01)
*H01Q 1/24* (2006.01)
*H01Q 21/06* (2006.01)

(52) U.S. Cl.
CPC ........... *H01Q 9/0485* (2013.01); *H01Q 1/246* (2013.01); *H01Q 21/06* (2013.01)

(58) Field of Classification Search
CPC ........ H01Q 1/246; H01Q 21/06; H01Q 21/24; H01Q 5/50; H01Q 9/0485
See application file for complete search history.

(56) References Cited

U.S. PATENT DOCUMENTS

2016/0322714 A1* 11/2016 Ying ........................ H01Q 1/50
2019/0288360 A1* 9/2019 Hendry .................. H01Q 13/06
(Continued)

FOREIGN PATENT DOCUMENTS

CN 107978854 A 5/2018
CN 207517870 U 6/2018
(Continued)

OTHER PUBLICATIONS

Duan et al., "Compact Dual-Band Dual-Polarized Base-Station Antenna Array With a Small Frequency Ratio Using Filtering Elements," IEEE Access, Sep. 4, 2019, 7:127800-127808.
(Continued)

*Primary Examiner* — Thien M Le
(74) *Attorney, Agent, or Firm* — Fish & Richardson P.C.

(57) ABSTRACT

This application provides example antennas and example base stations. One example antenna includes a reflection panel, a radiating element, and a resonator group. The resonator group is disposed between the reflection panel and the radiating element. The resonator group includes a first resonator, a second resonator, and a third resonator. The third resonator has a first connection portion and a second connection portion that are located at at least one open-circuit end. The first resonator is coupled to the first connection portion. The second resonator is coupled to the second connection portion. The third resonator is further coupled to the radiating element, and a signal may be transmitted between the third resonator and the radiating element. The
(Continued)

first resonator is configured to transmit a signal in a first frequency band. The second resonator is configured to transmit a signal in a second frequency band.

20 Claims, 7 Drawing Sheets

(56) References Cited

U.S. PATENT DOCUMENTS

| | | | | |
|---|---|---|---|---|
| 2020/0091608 | A1* | 3/2020 | Alpman | H01Q 9/0414 |
| 2021/0313710 | A1* | 10/2021 | Toprak | H01Q 1/38 |
| 2021/0336351 | A1 | 10/2021 | Zhang et al. | |
| 2022/0320712 | A1* | 10/2022 | Lu | H01Q 1/2283 |
| 2023/0090668 | A1* | 3/2023 | Theofanopoulos | H04M 1/0266 343/720 |
| 2024/0097339 | A1* | 3/2024 | Khatua | H01Q 9/0485 |
| 2024/0106128 | A1* | 3/2024 | Ramalingam | H01Q 1/42 |
| 2024/0106134 | A1* | 3/2024 | Ramalingam | H01Q 1/243 |
| 2024/0113436 | A1* | 4/2024 | Garrido Lopez | H01Q 3/30 |
| 2024/0204412 | A1* | 6/2024 | Ohira | H01Q 1/243 |
| 2024/0266716 | A1* | 8/2024 | Kim | H01Q 1/246 |

FOREIGN PATENT DOCUMENTS

| | | | |
|---|---|---|---|
| CN | 109473771 | A | 3/2019 |
| CN | 110828989 | A | 2/2020 |
| CN | 112072230 | A | 12/2020 |
| CN | 212380560 | U | 1/2021 |
| WO | 2019085504 | A1 | 5/2019 |

OTHER PUBLICATIONS

Mao et al., “Dual-Band Full-Duplex Tx/Rx Antennas for Vehicular Communications,” IEEE Transactions on Vehicular Technology, May 2018, 67(5):4059-4070.

International Search Report and Written Opinion in International Appln. No. PCT/CN2023/094153, mailed on Aug. 17, 2023, 16 pages (with English translation).

Extended European Search Report in European Appln. No. 23814937.1, mailed on Jul. 4, 2025, 12 pages.

* cited by examiner

ANTENNA AND BASE STATION

CROSS-REFERENCE TO RELATED APPLICATIONS

This application is a continuation of International Application No. PCT/CN2023/094153, filed on May 15, 2023, which claims priority to Chinese Patent Application No. 202210604355.6, filed on May 30, 2022. The disclosures of the aforementioned applications are hereby incorporated by reference in their entireties.

TECHNICAL FIELD

This application relates to the field of communication technologies, and in particular, to an antenna and a base station.

BACKGROUND

As a capacity requirement of a communication network increases, a base station antenna needs to be designed to support a plurality of frequency bands. There are generally three methods for designing a multi-band base station antenna. Two frequency bands are used as an example. In a first method, two radiating elements operating in different frequency bands are used, and space of the radiating elements operating in different frequency bands is designed separately. In a second method, a multi-band combiner is integrated into an antenna. In a third method, two radiators for filtering are designed in a coaxial manner, and two radiators operating in different frequency bands are placed at a same position, to implement dual-band operation. A radiator in one frequency band has a specific filtering suppression effect on a radiator in another frequency band. The foregoing several methods have problems such as a large size of an antenna, a high requirement on antenna space, high costs, or difficulty in mass production.

SUMMARY

This application provides an antenna and a base station, to reduce a volume of a multi-band antenna, reduce antenna space occupied by the antenna, and reduce antenna costs.

According to a first aspect, this application provides an antenna. The antenna includes a reflection panel, a radiating element, and a resonator group. The resonator group includes a plurality of coupled resonators, and the resonator group is disposed between the reflection panel and the radiating element. Specifically, the resonator group includes a first resonator, a second resonator, and a third resonator. The third resonator has a first connection portion and a second connection portion. The first connection portion and the second connection portion are located at at least one open-circuit end of the third resonator. The first resonator is coupled to the first connection portion. The second resonator is coupled to the second connection portion. To be specific, the first resonator and the second resonator are separately coupled to the open-circuit end of the third resonator, so that a signal can be transmitted between the first resonator and the third resonator, and a signal can be transmitted between the second resonator and the third resonator. The third resonator is further coupled to the radiating element, so that a signal can be transmitted between the third resonator and the radiating element. Therefore, the first resonator, the third resonator, and the radiating element form a signal transmission path, and the second resonator, the third resonator, and the radiating element may also form a signal transmission path. In a specific technical solution, the first resonator is configured to transmit a signal in a first frequency band. To be specific, the first resonator is equivalent to a filter, and only the signal in the first frequency band can be transmitted through the first resonator. The second resonator is configured to transmit a signal in a second frequency band. To be specific, the second resonator is also equivalent to a filter, and only the signal in the second frequency band can be transmitted through the second resonator. The first frequency band is different from the second frequency band. Therefore, the radiating element in this technical solution may be configured to transmit signals in at least two different frequency bands, and the antenna is at least a dual-band antenna.

When the antenna transmits a signal, the third resonator receives the signal in the first frequency band from the first resonator, receives the signal in the second frequency band from the second resonator, combines the signal in the first frequency band and the signal in the second frequency band into one channel of signal, and sends the channel of signal to the radiating element. Then, the signal is transmitted through the radiating element. When the antenna receives a signal, the third resonator splits the signal received by the radiating element into the signal in the first frequency band and the signal in the second frequency band, sends the signal in the first frequency band to the first resonator, and sends the signal in the second frequency band to the second resonator. The first resonator and the second resonator are separately connected to an input/output port of the antenna, and the signal received by the radiating element may be sent to a signal processing unit such as a remote radio unit through the input/output port.

In the technical solution of this application, the third resonator may be implemented as a transmission line, and therefore, a size of the third resonator is small. The third resonator may have two open-circuit points. In other words, two ends of the third resonator are open-circuit ends. Therefore, there may be more space for disposing other structures such as the first resonator and the second resonator, so that cabling is facilitated, a size of the antenna is reduced, and a signal loss is reduced. In addition, a coupling of the plurality of resonators further helps implement a wide bandwidth of the antenna, and improves a pattern effect of the antenna. In conclusion, combined feeding of signals in different frequency bands can be implemented through the resonator group disposed between the radiating element and the reflection panel, and a structure is simple, so that the antenna has a small size and occupies small antenna space. In addition, a signal loss of the antenna is low, and the antenna is applicable to a multi-band transmit-receive separation architecture, and is applicable to a wide range of application scenarios. Certainly, according to an actual product form, when the third resonator has one open-circuit point, that is, when the third resonator has one open-circuit end, a technical objective of this application may also be achieved.

A specific structure shape of the third resonator is not limited in embodiments of this application. For example, the third resonator may be of a sheet structure, or may be of a three-dimensional structure. The structure shape of the third resonator is specifically designed and selected based on an actual requirement.

In a specific technical solution, the radiating element may be a single-polarization radiating element, or may be a dual-polarization radiating element. This is not limited in this application. When the radiating element is the dual-polarization radiating element, the dual-polarization radiating element includes a first polarization direction and a second polarization direction. The first polarization direction may be different from the second polarization direction. For example, the first polarization direction may be perpendicular to the second polarization direction. The antenna includes two resonator groups, and each of the two resonator groups has one third resonator. In other words, the two resonator groups include two third resonators. The two third resonators extend in the first polarization direction and the second polarization direction respectively. In other words, an extension direction of the third resonator is the same as a corresponding polarization direction.

When the third resonator is specifically disposed, orthographic projection of a center point of the third resonator on the reflection panel overlaps orthographic projection of a center point of the radiating element on the reflection panel. In this solution, signal transmission symmetry can be improved, and communication performance of the antenna can be improved.

An electrical length a of the third resonator and a wavelength λ corresponding to a center frequency of an operating frequency band of the radiating element satisfy: $a=\frac{1}{2}\lambda$. In this solution, signal transmission in the third resonator can be facilitated, so that a signal transmitted by the radiating element is transmitted better in the third resonator.

The open-circuit end of the third resonator is specifically an end part of the third resonator close to the open-circuit point. A length L1 of an open-circuit end in a first direction and a length L of the third resonator in the first direction satisfy: $L1\leq\frac{1}{8}L$. The first direction is the extension direction of the third resonator. In this solution, a coupling between the third resonator and the first resonator and a coupling between the third resonator and the second resonator are facilitated.

The third resonator is located between the radiating element and the reflection panel. Specifically, a distance M1 between the third resonator and the radiating element in a second direction and the wavelength λ corresponding to the center frequency of the operating frequency band of the radiating element satisfy: $M1\leq\frac{1}{4}\lambda$. The second direction is a direction perpendicular to the reflection panel. In this solution, the antenna can obtain a good pattern. In addition, this helps increase a bandwidth that can be used by the antenna to propagate a signal, and transmission of a signal of a high frequency band is facilitated.

In addition, a distance M2 between the third resonator and the reflection panel in the second direction and the wavelength λ corresponding to the center frequency of the operating frequency band of the radiating element satisfy: $M2\leq\frac{1}{10}\lambda$. Similarly, the second direction is the direction perpendicular to the reflection panel. In this solution, interference radiation generated by the third resonator can be reduced, and interference to a radiation signal of the radiating element is low, to help improve a radiation capability of the antenna.

From another perspective, the distance M1 between the third resonator and the radiating element in the second direction and the distance M2 between the third resonator and the reflection panel in the second direction satisfy: $M2\leq M1$. In other words, the third resonator is disposed closer to the reflection panel.

In a further technical solution, the antenna further includes at least one fourth resonator. The fourth resonator is located on a side of the third resonator facing the radiating element. In other words, the fourth resonator is located between the third resonator and the radiating element.

In a specific technical solution, the antenna may include one fourth resonator. In this case, a side of the fourth resonator is coupled to the third resonator, and another side of the fourth resonator is coupled to the radiating element. The radiating element resonates a signal by using a multi-level resonator, and a coupling degree is low. In this case, sensitivity of the signal is reduced, and the signal is not easily interfered, so that a radiation pattern of the entire antenna is better, and this helps implement better cross-polarization performance in a wider bandwidth.

In another specific technical solution, the antenna may include at least two fourth resonators. A fourth resonator adjacent to the third resonator is coupled to the third resonator. A fourth resonator adjacent to the radiating element is coupled to the radiating element. Two adjacent fourth resonators are coupled.

When the fourth resonator is specifically disposed, orthographic projection of a center point of the fourth resonator on the reflection panel overlaps the orthographic projection of the center point of the radiating element on the reflection panel. In this solution, signal transmission symmetry can be improved, and communication performance of the antenna can be improved.

When the fourth resonator is specifically disposed, the fourth resonator may be disposed in parallel with the third resonator, or the fourth resonator may be disposed perpendicular to the third resonator. This is not limited in this application. In a specific technical solution, the fourth resonator may extend in the second direction. The second direction is the direction perpendicular to the reflection panel.

An electrical length b of the fourth resonator and the λ corresponding to the center frequency of the operating frequency band of the radiating element satisfy: $b=\frac{1}{2}\lambda$. In this solution, a signal transmitted by the radiating element can be transmitted better in the fourth resonator.

The antenna in the technical solution of this application further includes a transmission line. The transmission line is connected between the first resonator and the second resonator. Specifically, the transmission line may be directly connected to the first resonator and the second resonator separately, or may be coupled to the first resonator and the second resonator, provided that a signal can be transmitted. In addition, the transmission line is further connected to an input/output port of the antenna. In this solution, an entire radio frequency link can be simplified, and signals in two frequency bands can be transmitted through one input/output port, to help reduce a quantity of input/output ports.

According to a second aspect, this application further provides a base station. The base station includes a mounting support and the antenna in the first aspect. The antenna is installed on the mounting support. The antenna in the base station can support signal transmission in a plurality of frequency bands, and a volume of the antenna is small, to help improve density of antennas in a base station layout, and improve utilization of antenna space.

REFERENCE NUMERALS

1—Antenna; 11—Radome;
12—Radiating element; 13—Reflection panel;
14—Resonator group; 141—First resonator;
142—Second resonator; 143—Third resonator;
1431—First connection portion; 1432—Second connection portion;
144—Fourth resonator; 145—Fifth resonator;
146—Sixth resonator; 15—Dielectric substrate;
16—Transmission line; 2—Mounting support;
3—Remote radio unit; 4—Baseband processing unit; and
5—Cable.

DESCRIPTION OF EMBODIMENTS

Figure 1:
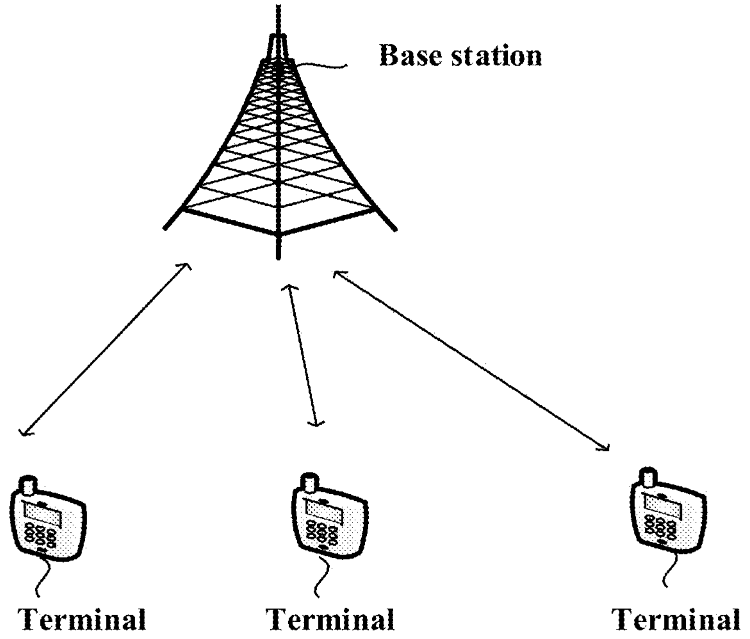
FIG. 1 is a diagram of a system architecture to which an embodiment of this application is applicable.

To facilitate understanding of a communication apparatus and a base station provided in embodiments of this application, the following describes an application scenario of the communication apparatus and the base station. FIG. 1 is a diagram of a system architecture to which an embodiment of this application is applicable. As shown in FIG. 1, the application scenario may include a base station and a terminal. Wireless communication may be implemented between the base station and the terminal. The base station may also be referred to as an access network device, and may be located in a base station subsystem (BBS), a terrestrial radio access network (UTRAN), or an evolved terrestrial radio access network (E-UTRAN), and is configured to perform cell coverage of a signal to implement communication between a terminal device and a wireless network. Specifically, the base station may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in a long term evolution (LTE) system, or may be a radio controller in a cloud radio access network (CRAN) scenario. Alternatively, the base station may be a relay station, an access point, a vehicle-mounted device, a wearable device, a g node (gNodeB or gNB) in a new radio (NR) system, an access network device in a future evolved network, or the like. This is not limited in embodiments of this application.

Figure 2:
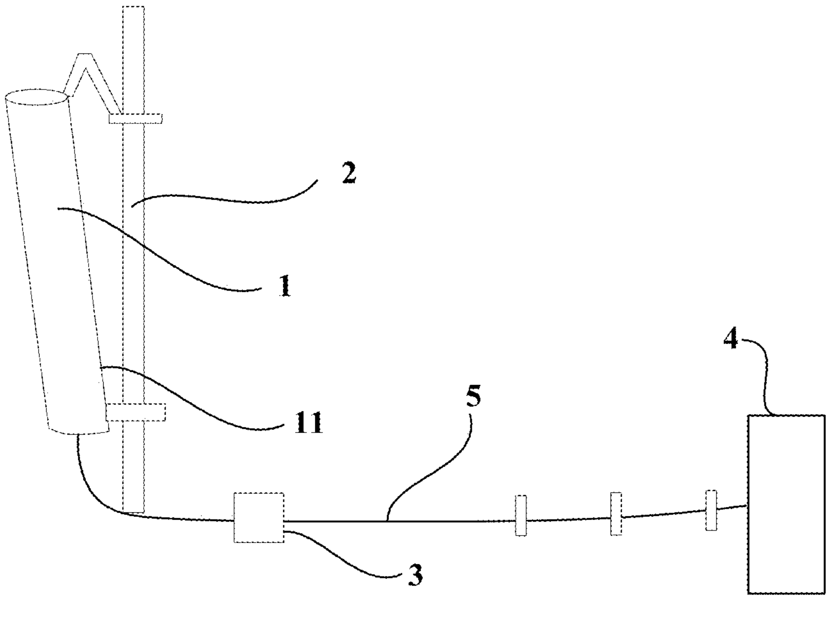
FIG. 2 is a diagram of a possible structure of a base station according to an embodiment of this application.

A base station is equipped with an antenna to implement signal transmission in space. FIG. 2 is a diagram of a possible structure of a base station according to an embodiment of this application. As shown in FIG. 2, the base station may usually include structures such as an antenna 1 and a mounting support 2. The antenna 1 is installed on the mounting support 2, to receive or transmit a signal of the antenna 1. Specifically, the mounting support 2 may be a pole, a tower, or the like. FIG. 2 shows only an example of components that may be included in the base station and position relationships between the components. In another embodiment, the base station may further include another component, or position relationships between the components are different from the position relationships shown in FIG. 2.

In a specific technical solution, the antenna 1 may further include a radome 11. The radome 11 has a good electromagnetic wave penetration characteristic in terms of electrical performance, and can withstand impact of an external harsh environment in terms of mechanical performance, so that the radome 11 can protect the antenna 1 from being affected by an external environment.

In addition, the base station may further include a remote radio unit 3 and a baseband processing unit 4. As shown in FIG. 2, the baseband processing unit 4 may be connected to the antenna 1 through the remote radio unit 3. The baseband processing unit 4 may be connected to a feeding network of the antenna 1 through the remote radio unit 3. In some implementations, the remote radio unit 3 may also be referred to as a remote radio unit (RRU), and the baseband processing unit 4 may also be referred to as a baseband unit (BBU).

In a possible embodiment, as shown in FIG. 2, both the remote radio unit 3 and the baseband processing unit 4 may be located at a remote end of the antenna 1. The remote radio unit 3 and the baseband processing unit 4 may be connected through a cable 5. It should be noted that FIG. 2 shows only an example of a position relationship between the remote radio unit 3 and the antenna 1.

Figure 3:
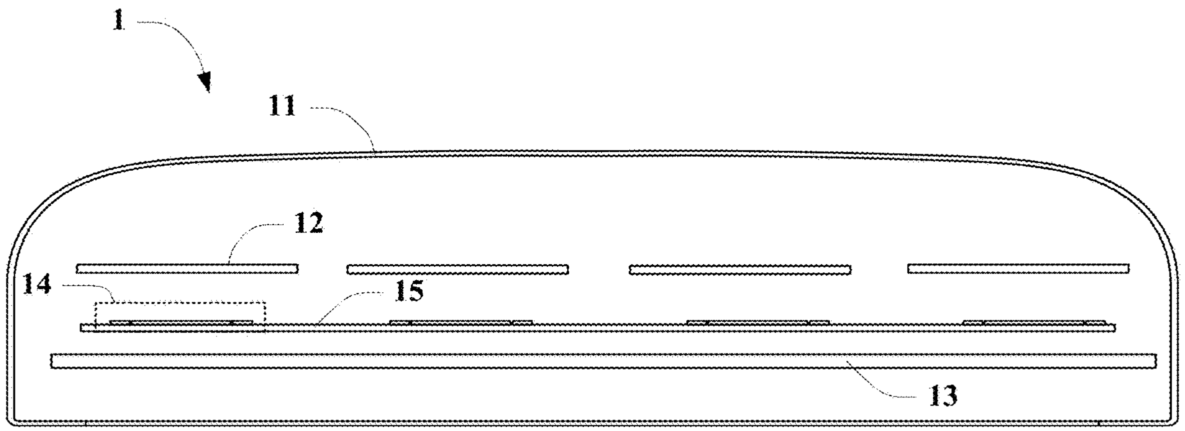
FIG. 3 is a diagram of a partial structure of an antenna according to an embodiment of this application.

More specifically, refer to FIG. 2 and FIG. 3 together. FIG. 3 is a diagram of composition of an antenna according to a possible embodiment of this application. As shown in FIG. 3, the antenna 1 may include a radiating element 12 and a reflection panel 13. The radiating element 12 may also be referred to as an antenna element, an element, or the like, and can effectively send or receive an antenna signal. In the antenna 1, frequencies of different radiating elements 12 may be the same or different. The reflection panel 13 may also be referred to as a bottom panel, an antenna panel, a reflective surface, or the like, and may be made of a metal material. When the antenna 1 receives a signal, the reflection panel 13 may reflect and aggregate signals of the antenna 1 on a reception point. The radiating element 12 is usually placed on a side of the reflection panel 13. This may not only greatly enhance a signal receiving or transmitting capability of the antenna 1, but also block and shield an interference signal from a back side of the reflection panel 13 (where the back side of the reflection panel 13 in this application is a side that faces away from the side that is of the reflection panel 13 and on which the radiating element 12 is disposed).

For an antenna in the conventional technology, to implement transmission of a dual-band or multi-band signal, several antenna implementation methods are developed. However, different methods have different problems. Two frequency bands are used as an example. In a first method, two radiating elements operating in different frequency bands are used, and space of the two radiating elements operating in different frequency bands is designed separately, to form high space isolation. However, this causes a large size of an antenna, and poses a great challenge to a limited size of an antenna aperture. In a second method, a multi-band combiner is integrated into an antenna. In this method, a loss, a weight, and costs caused by the combiner are introduced because the combiner is used. In a third method, two radiators for filtering are designed in a coaxial manner, and two radiators operating in different frequency bands are placed at a same position, to implement dual-band operation. A radiator in one frequency band has a specific filtering suppression effect on a radiator in another frequency band, and specific isolation is achieved. This design method has a high requirement on a material process, to achieve a stable filtering suppression effect. In a scenario in which a frequency spacing is short, mass production is difficult to be implemented. Therefore, this application provides an antenna to resolve the foregoing problems.

The antenna in this embodiment of this application may be an active antenna, or may be a passive antenna. This is not limited in this application.

Still refer to FIG. 3. The antenna 1 in this embodiment of this application includes the reflection panel 13, the radiating element 12, and a resonator group 14. The resonator group 14 is disposed between the reflection panel 13 and the radiating element 12. In a specific embodiment, the resonator group 14 may be located on a dielectric substrate 15. The radiating element 12 may be located on a mechanical part (not shown). The mechanical part may be specifically an insulation part, to reduce shielding of an antenna signal. The mechanical part is fastened to a structure such as the reflection panel 13 or the radome 11, so that the radiating element 12 can be fastened and installed.

It should be noted that "transmission" of a signal in embodiments of this application means signal transmission in two directions: sending and/or receiving. In other words, "transmission" in embodiments of this application may specifically mean sending a signal, or may mean receiving a signal, or may mean sending a signal and receiving a signal. In addition, a "coupling" in embodiments of this application means that energy can be transmitted or exchanged between two components. An example in which two transmission lines are coupled is used. In one case, the two transmission lines are not directly connected in a physical structure. However, energy may be transmitted or exchanged between the two transmission lines provided that a distance between the two transmission lines is short enough, and there is no interference from another medium or conductor between the two transmission lines. A connection between the two transmission lines is referred to as a coupling.

The radiating element in this application includes a dual-polarization radiating element, a single-polarization radiating element, and the like. To simplify the accompanying drawings and clearly express points of this application, in the accompanying drawings of the following embodiments, an example in which the radiating element 12 is a single-polarization radiating element 12 is first used to describe the technical solutions of this application. Subsequently, how to obtain a dual-polarization radiating element based on a technical solution of a single-polarization radiating element is described.

Figure 4:
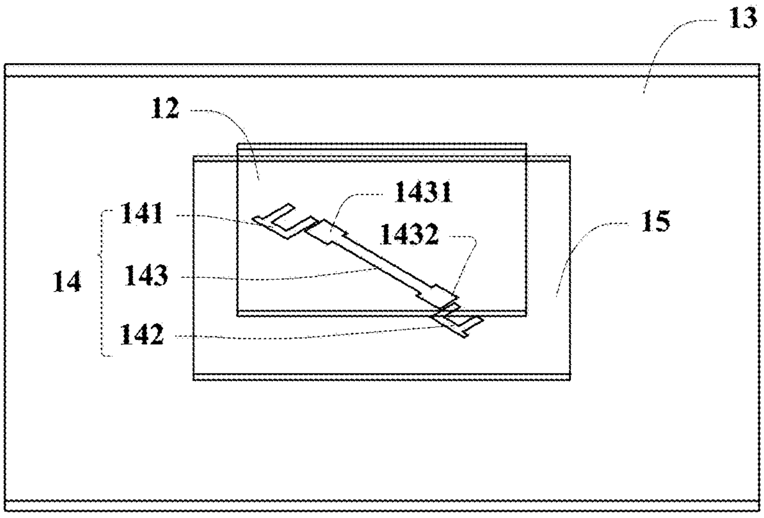
FIG. 4 is a diagram of a partial structure of an antenna according to an embodiment of this application.
Figure 5:
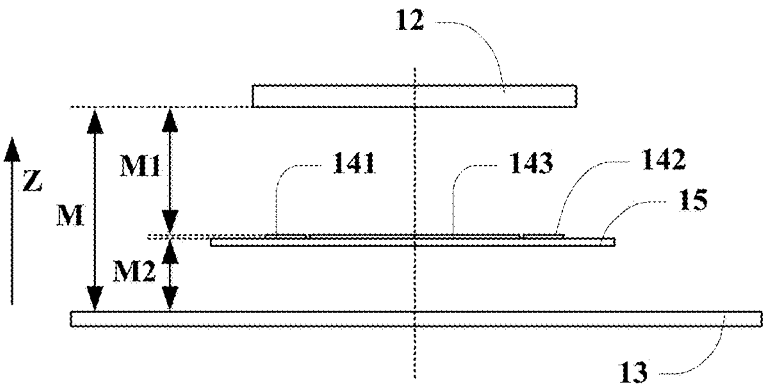
FIG. 5 is a partial lateral sectional view of an antenna according to an embodiment of this application.

FIG. 4 is a diagram of a partial structure of an antenna according to an embodiment of this application. FIG. 5 is a partial lateral sectional view of an antenna according to an embodiment of this application. As shown in FIG. 4 and FIG. 5, the resonator group 14 specifically includes a first resonator 141, a second resonator 142, and a third resonator 143. The first resonator 141 is configured to transmit a signal in a first frequency band. To be specific, the first resonator 141 is equivalent to a filter of the antenna 1 in the first frequency band, and only the signal in the first frequency band can be transmitted through the first resonator 141. Similarly, the second resonator 142 is configured to transmit a signal in a second frequency band. To be specific, the second resonator 142 is equivalent to a filter of the antenna 1 in the second frequency band, and only the signal in the second frequency band can be transmitted through the second resonator 142. The first frequency band is different from the second frequency band, so that signals in different frequency bands are transmitted through the first resonator 141 and the second resonator 142, and the radiating elements 12 can operate in different frequency bands. The third resonator 143 has an open-circuit end, and the open-circuit end has a first connection portion 1431 and a second connection portion 1432. The first resonator 141 is coupled to the first connection portion 1431, so that signal transmission can be performed between the first resonator 141 and the third resonator 143. The second resonator 142 is coupled to the second connection portion 1432. Similarly, signal transmission can be performed between the second resonator 142 and the third resonator 143. The third resonator 143 is coupled to the radiating element 12, so that signal transmission can be performed between the third resonator 143 and the radiating element 12. In other words, both the first resonator 141 and the second resonator 142 may perform signal transmission with the radiating element 12 through the third resonator 143. For example, the third resonator 143 is equivalent to a combiner. The first resonator 141 is connected to an input/output port, and the second resonator 142 is also connected to an input/output port. Specifically, the input/output ports connected to the first resonator 141 and the second resonator 142 may be the same or different. This is not limited in this application. The input/output port may be connected to a signal processing unit such as a remote radio unit.

Specifically, when the antenna 1 transmits a signal, the signal that needs to be transmitted is sent to the first resonator 141 and the second resonator 142 from the input/output ports through the signal processing unit such as the remote radio unit. The first resonator 141 performs filtering on the signal in the first frequency band, so that the signal in the first frequency band is sent to the third resonator 143 through the first resonator 141. The second resonator 142 performs filtering on the signal in the second frequency band, so that the signal in the second frequency band is sent to the third resonator 143 through the second resonator 142. The third resonator 143 combines the received signal in the first frequency band and the received signal in the second frequency band into one channel of signal, and sends the channel of signal to the radiating element 12. Then, the signal is transmitted through the radiating element 12. It should be noted that an operating frequency band of the third resonator includes the first frequency band and the second frequency band. In a specific embodiment, a lowest operating frequency of the third resonator may be at most a lower one of the first frequency band and the second frequency band, and a highest operating frequency of the third resonator may be at least a higher one of the first frequency band and the second frequency band. In other words, both the signal in the first frequency band and the signal in the second frequency band can be transmitted through the third resonator. When the antenna 1 receives a signal, the third resonator 143 splits the signal received by the radiating element 12 into the signal in the first frequency band and the signal in the second frequency band, sends the signal in the first frequency band to the first resonator 141, and sends the signal in the second frequency band to the second resonator 142. The signals are received through the first resonator 141 and the second resonator 142. After receiving the signals, the first resonator 141 and the second resonator 142 may send the signals to the signal processing unit such as the remote radio unit through the input/output port, to perform communication.

Figure 6:
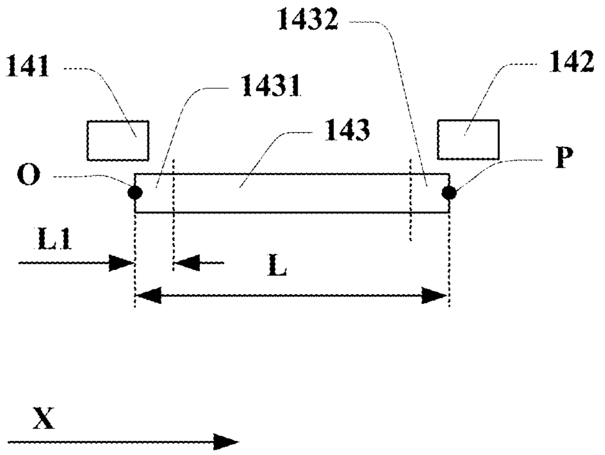
FIG. 6 is a diagram of another structure of a resonator group according to an embodiment of this application.

The following describes an example of an "open-circuit end" in this application. FIG. 6 is a diagram of another structure of a resonator group according to an embodiment of this application. In the embodiment shown in FIG. 6, the third resonator 143 has two open-circuit points, and the two open-circuit points are respectively O and P. An open-circuit end is an area in which the third resonator 143 includes the open-circuit point. In this embodiment of this application, the open-circuit end is located in an area in which a length of the open-circuit point toward a center of the third resonator 143 is one eighth of a total length of the third resonator 143. It may be considered that the open-circuit end includes a corresponding open-circuit point. To be specific, a length L1 of the open-circuit end in a first direction X and a length L of the third resonator 143 in the first direction X satisfy: $L1 \leq \frac{1}{8}L$. The first direction X is an extension direction of the third resonator 143. In this solution, a coupling between the third resonator 143 and the first resonator 141 and a coupling between the third resonator 143 and the second resonator 142 are facilitated.

In this embodiment of this application, the third resonator 143 may be implemented as a transmission line, and therefore, a size of the third resonator 143 is small. The third resonator 143 may have two open-circuit points. In other words, two ends of the third resonator 143 are open-circuit ends. Therefore, there may be more space for disposing other structures such as the first resonator 141 and the second resonator 142, so that cabling is facilitated, and a size of the antenna 1 is reduced, thereby reducing a requirement on a size of an antenna aperture of the antenna 1. In addition, if the size of the third resonator 143 is small, a loss of a signal transmitted by the antenna is small, costs are low, and a weight of the antenna is small. In addition, a coupling of a plurality of resonators further helps implement a wide bandwidth of the antenna 1, and improves a pattern effect of the antenna 1. In conclusion, combined feeding of signals in different frequency bands can be implemented through the resonator group 14 disposed between the radiating element 12 and the reflection panel 13, and a structure is simple, so that the antenna 1 has a small size, and the loss of the signal is low, and the antenna is applicable to a multi-band transmit-receive separation architecture, and is applicable to a wide range of application scenarios. In addition, the implementation of the solution is simple, and it is beneficial to implement mass production.

The first resonator 141 may be a half-wavelength resonator, or may be a quarter-wavelength resonator that is short-circuited at one end. A wavelength herein is a wavelength corresponding to a center frequency of the first frequency band. In addition, the first resonator 141 may be a single-mode resonator, or may be a multimode resonator. This is not limited in this application. Similarly, the second resonator 142 may be a half-wavelength resonator, or may be a quarter-wavelength resonator that is short-circuited at one end. A wavelength herein is a wavelength corresponding to a center frequency of the second frequency band. In addition, the second resonator 142 may be a single-mode resonator, or may be a multimode resonator. This is not limited in this application.

In a specific embodiment, the first resonator 141 may alternatively be of a conductor structure of any dielectric carrier, for example, may be a transmission line, a metal conductor, a slot line, a strip line, a circuit board microstrip, a dielectric substrate microstrip, a dielectric waveguide, or the like. This is not limited in this application. Similarly, the second resonator 142 may also be of a conductor structure of any dielectric carrier, for example, may be a metal wire, a metal conductor, a slot line, a strip line, a circuit board microstrip, a dielectric substrate microstrip, a dielectric waveguide, or the like. This is not limited in this application.

Similarly, in a specific embodiment, the third resonator 143 may also be of a conductor structure of any dielectric carrier, for example, may be a transmission line, a metal conductor, a slot line, a strip line, a circuit board microstrip, a dielectric substrate microstrip, a dielectric waveguide, or the like. This is not limited in this application. Specifically, the third resonator 143 may be a half-wavelength transmission line.

Transmission line forms of the first resonator 141, the second resonator 142, and the third resonator 143 may be the same or different. In other words, the first resonator 141, the second resonator 142, and the third resonator 143 may be of conductor structures of a same dielectric carrier or conductor structures of different dielectric carriers. When the transmission line forms of the first resonator 141, the second resonator 142, and the third resonator 143 are the same, it is convenient to manufacture the first resonator 141, the second resonator 142, and the third resonator 143, and the resonators may be formed through one process, to reduce manufacturing costs, so as to reduce manufacturing costs of the antenna 1.

Still refer to FIG. 5. In a specific embodiment, a distance M between the radiating element 12 and the reflection panel 13 in a second direction Z and a wavelength λ corresponding to a center frequency of an operating frequency band of the radiating element 12 satisfy: $M \leq \frac{1}{3}\lambda$. The second direction Z is a direction perpendicular to the reflection panel 13. The distance M is a distance, in the second direction Z, between a geometric center of a surface of the radiating element 12 facing the reflection panel 13 and a surface of the reflection panel 13 facing the radiating element. The operating frequency band of the radiating element 12 is a frequency band between a lowest frequency and a highest frequency in all operating frequency bands that can be used for transmission by the radiating element 12, and the center frequency is a frequency corresponding to an intermediate value of a sum of a lowest frequency and a highest frequency in all the operating frequency bands that can be used for transmission by the radiating element 12. For the "operating frequency band of the radiating element 12" in the following, refer to this concept. Therefore, details are not described below. In an implementation, the radiating element 12 is a half-wavelength resonator. An example in which the radiating element 12 in FIG. 4 is rectangular is used. During actual application, a shape of the radiating element 12 is not limited in this application. For example, the shape of the radiating element 12 may be any form such as a rectangle, a square, a circle, or a strip.

The third resonator 143 is located below the radiating element 12. In addition, a distance M1 between the third resonator 143 and the radiating element 12 in the second direction Z and the wavelength λ corresponding to the center frequency of the operating frequency band of the radiating element 12 satisfy: M1≤¼λ. The distance M1 is a distance, in the second direction Z, between a geometric center of a surface of the third resonator 143 facing the radiating element 12 and a surface of the radiating element 12 facing the third resonator 143. In this solution, the antenna 1 can obtain a good pattern. In addition, this helps increase a bandwidth that can be used by the antenna 1 to propagate a signal, and transmission of a signal of a high frequency band is facilitated.

In another embodiment, a distance M2 between the third resonator 143 and the reflection panel 13 in the second direction Z and the wavelength λ corresponding to the center frequency of the operating frequency band of the radiating element 12 satisfy: M2≤1/10λ. The distance M2 is a distance, in the second direction Z, between a geometric center of a surface of the third resonator 143 facing the reflection panel 13 and a surface of the reflection panel 13 facing the third resonator 143. A shorter distance M2 between the third resonator 143 and the reflection panel 13 in the second direction Z indicates less interference radiation generated by the third resonator 143, and less interference to a radiation signal of the radiating element 12, to help improve a radiation capability of the antenna 1.

Still refer to FIG. 5. In an embodiment, the distance M1 between the third resonator 143 and the radiating element 12 in the second direction Z and the distance M2 between the third resonator 143 and the reflection panel 13 in the second direction Z satisfy: M2<M1. In other words, the third resonator 143 is disposed closer to the reflection panel 13.

Still refer to FIG. 5. In a specific embodiment, orthographic projection of a center point of the third resonator 143 on the reflection panel 13 overlaps orthographic projection of a center point of the radiating element 12 on the reflection panel 13. It may be understood that "overlapping" is an ideal case in a design process. In an actual manufacturing and application process, the orthographic projection of the center point of the third resonator 143 on the reflection panel 13 and the orthographic projection of the center point of the radiating element 12 on the reflection panel 13 may have a specific error, and this also falls within the protection scope of this application. In this solution, signal transmission symmetry can be improved, and communication performance of the antenna 1 can be improved.

Figure 7:
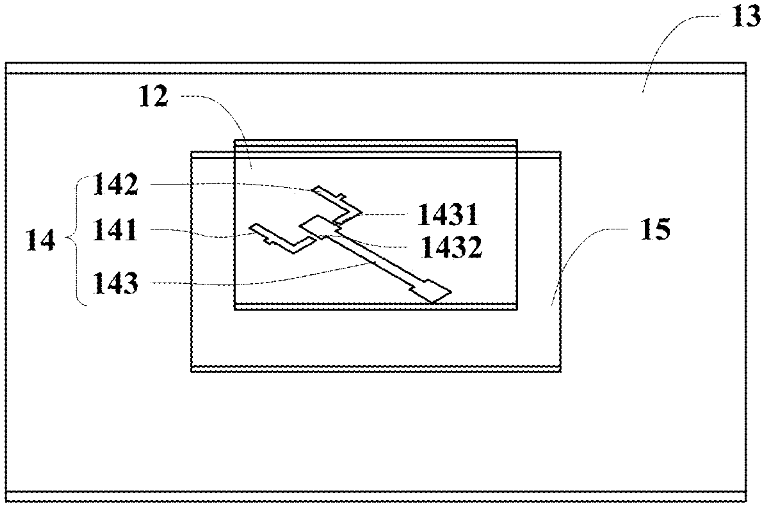
FIG. 7 is a diagram of another partial structure of an antenna according to an embodiment of this application.

FIG. 7 is a diagram of another partial structure of an antenna according to an embodiment of this application. With reference to FIG. 4 and FIG. 7, the first connection portion 1431 and the second connection portion 1432 of the third resonator 143 may be located on a same side of the third resonator 143, or may be located on different sides of the third resonator 143. This is not limited in this application. For example, in the embodiment shown in FIG. 4, the first connection portion 1431 and the second connection portion 1432 of the third resonator 143 are located on two different sides of the third resonator 143. It may be understood that, in the embodiment shown in FIG. 4, the third resonator 143 has two open-circuit ends, and the first connection portion 1431 and the second connection portion 1432 are located at different open-circuit ends. In the embodiment shown in FIG. 7, the first connection portion 1431 and the second connection portion 1432 of the third resonator 143 are located on a same side of the third resonator 143. In other words, the first connection portion 1431 and the second connection portion 1432 are located on a same open-circuit end. In this case, the third resonator 143 may have one open-circuit end, or may have two open-circuit ends. To be specific, a side of the third resonator 143 away from the first connection portion 1431 and the second connection portion 1432 may be an open-circuit point, or may be grounded. This is not limited in this application. In conclusion, in this embodiment of this application, a specific location in which the first resonator 141 and the second resonator 142 are coupled to the third resonator 143 is not limited, provided that the first resonator 141 and the second resonator 142 are coupled to the open-circuit end of the third resonator 143.

Figure 8:
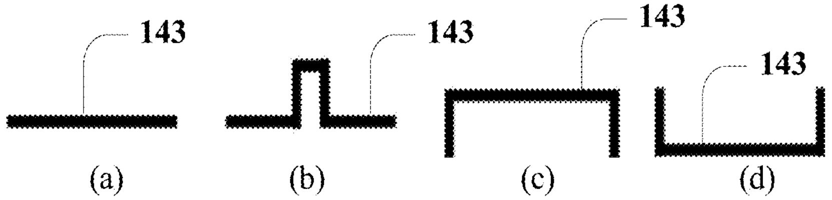
FIG. 8 is a diagram of a structure of a third resonator according to an embodiment of this application.

FIG. 8 is a diagram of a structure of a third resonator 143 according to some embodiments of this application. Refer to FIG. 8. When the third resonator 143 is specifically disposed, the third resonator 143 may be of a sheet structure, or may be of a three-dimensional structure. For example, in the embodiment shown in FIG. 8, the third resonator 143 shown in (a) of FIG. 8 is of a sheet structure, and the third resonator 143 shown in (b), (c), and (d) in FIG. 8 is of a three-dimensional structure. The third resonator 143 may be understood as a third resonator 143 formed by bending a sheet-like transmission line into a three-dimensional structure.

Figure 9:
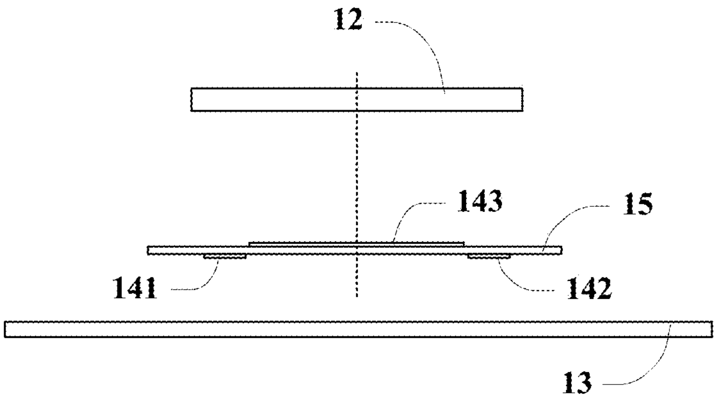
FIG. 9 is another partial lateral sectional view of an antenna according to an embodiment of this application.

FIG. 9 is another partial lateral sectional view of an antenna according to an embodiment of this application. Refer to FIG. 5 and FIG. 9. In a specific embodiment, the first resonator 141 and the second resonator 142 may be located in a same plane as the third resonator 143, as shown in FIG. 5. In a specific embodiment, when the first resonator 141, the second resonator 142, and the third resonator 143 are all located on a dielectric substrate, the first resonator 141, the second resonator 142, and the third resonator 143 may be located on a same side of the dielectric substrate 15, for example, on a surface of a side of the dielectric substrate 15 facing the radiating element 12, as shown in FIG. 5. Certainly, in another embodiment, the first resonator 141, the second resonator 142, and the third resonator 143 may all be located on a surface of a side of the dielectric substrate 15 away from the radiation unit 12. Alternatively, when the dielectric substrate 15 is of a multi-layer structure, the first resonator 141, the second resonator 142, and the third resonator 143 may be located on a same layer of the dielectric substrate 15. Alternatively, in the embodiment shown in FIG. 9, the first resonator 141 and the second resonator 142 may be located in a plane different from that of the third resonator 143. For example, as shown in FIG. 9, when the first resonator 141, the second resonator 142, and the third resonator 143 are all located on the dielectric substrate 15, the first resonator 141 and the second resonator 142 may be located on a surface of a side of the dielectric substrate 15 away from the radiating element 12, and the third resonator 143 is located on a surface of a side of the dielectric substrate 15 facing the radiating element 12. Alternatively, in another embodiment, the first resonator 141 and the second resonator 142 may be located on a side of the dielectric substrate 15 facing the radiating element 12, and the third resonator 143 is located on a side of the dielectric substrate away from the radiating element 12. Alternatively, in another embodiment, when the dielectric substrate 15 is of a multi-layer structure, the first resonator 141, the second resonator 142, and the third resonator 143 may be located on different layers. Details are not described in this application.

The first resonator 141 may be formed by coupling a plurality of resonators that are configured to perform transmission in the first frequency band, or may be of a single structure. Similarly, the second resonator 142 may be formed by coupling a plurality of resonators that are configured to perform transmission in the second frequency band, or may be of a single structure.

When the third resonator 143 is specifically disposed, a relationship between an electrical length a of the third resonator 143 and the wavelength λ corresponding to the center frequency of the operating frequency band of the radiating element 12 satisfies: $a=\frac{1}{2}\lambda$. In this solution, a signal transmitted by the radiating element 12 is transmitted better in the third resonator 143. Specifically, to make the solution clearer, the following describes a concept of the electrical length. First, in an extension direction of a component, the component has a first end and a second end, and a length of an extended track from the first end to the second end may be a physical length of the component. The physical length of the component may correspond to an electrical length of the component, that is, $dI=d0*T/T0$, where dI represents the electrical length of the component, d0 represents the physical length of the component, T represents propagation time of an electromagnetic wave through the component, and T0 represents propagation time of the electromagnetic wave in free space over an equal propagation distance. In some embodiments, one component may include a plurality of parts with different extension directions. A physical length of the component may be a sum of physical lengths of the plurality of parts. An electrical length of the component may be a sum of electrical lengths of the plurality of parts.

Figure 10:
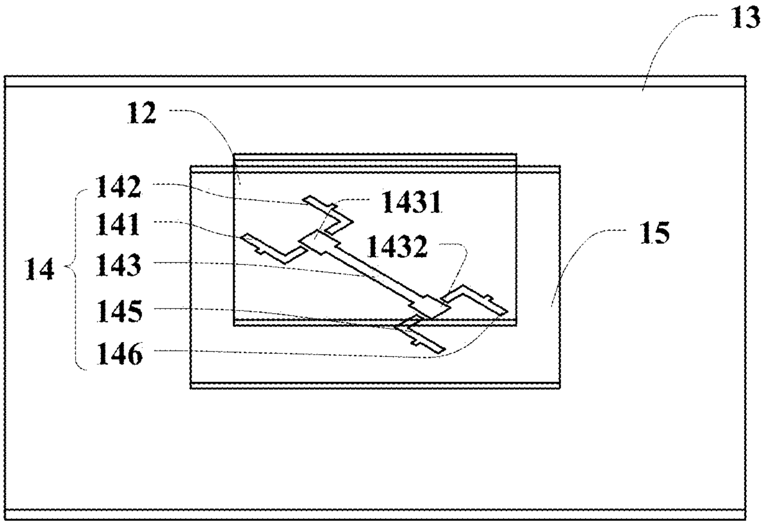
FIG. 10 is a diagram of another partial structure of an antenna according to an embodiment of this application.

In the foregoing embodiment, only an example in which the antenna 1 is a dual-band combining and filtering antenna 1 is used for description. In other words, an operating frequency band of the antenna 1 includes the first frequency band and the second frequency band. During actual application, the antenna 1 may alternatively include more operating frequency bands, and signals in different frequency bands correspond to different resonators. However, the signals in different frequency bands may be combined and split through third resonators 143 coupled to the corresponding resonators. For example, FIG. 10 is a diagram of another partial structure of an antenna according to an embodiment of this application. Refer to FIG. 10. In this embodiment, the antenna 1 is a quad-frequency combining and filtering antenna. To be specific, the resonator group 14 further includes a fifth resonator 145 and a sixth resonator 146. The fifth resonator 145 is configured to transmit a signal in a third frequency band, and the sixth resonator 146 is configured to transmit a signal in a fourth frequency band. The first frequency band, the second frequency band, the third frequency band, and the fourth frequency band are different. The fifth resonator 145 and the sixth resonator 146 are similar to the first resonator 141 and the second resonator 142, and the only difference lies in different operating frequency bands. The open-circuit end of the third resonator 143 further includes a third connection portion and a fourth connection portion. The fifth resonator 145 is coupled to the third connection portion, and the sixth resonator 146 is coupled to the fourth connection portion. In this case, the third resonator 143 may combine and split signals in the four frequency bands. Details are not described herein.

Figure 11:
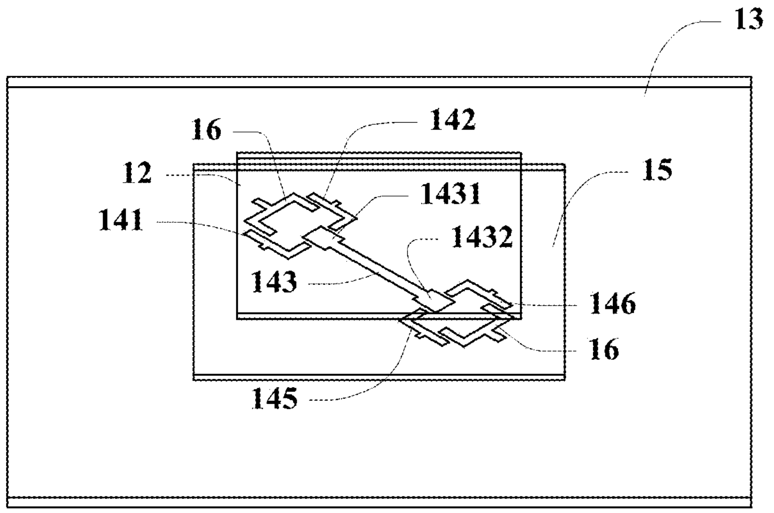
FIG. 11 is a diagram of another partial structure of an antenna according to an embodiment of this application.

In the embodiment shown in FIG. 10, the antenna 1 includes the first resonator 141, the second resonator 142, the fifth resonator 145, and the sixth resonator 146. Each resonator operates independently, and each resonator is connected to one input/output port. Therefore, in the embodiment shown in FIG. 10, the radiating element 12 needs at least four input/output ports. FIG. 11 is a diagram of another partial structure of an antenna according to an embodiment of this application. Refer to FIG. 11. To reduce a quantity of input/output ports of the antenna 1, the antenna 1 may further include a transmission line 16. The transmission line 16 is connected between the first resonator 141 and the second resonator 142. Specifically, the transmission line 16 may be directly connected to the first resonator 141 and the second resonator 142 separately, or may be coupled to the first resonator 141 and the second resonator 142, provided that a signal can be transmitted. The transmission line 16 is further connected to the input/output port of the antenna 1. In this solution, an entire radio frequency link can be simplified, and signals in two frequency bands can be transmitted through one input/output port, to help reduce a quantity of input/output ports. In the embodiment shown in FIG. 11, a transmission line 16 may also be connected between the fifth resonator 145 and the sixth resonator 146 of the antenna 1, to form a quad-frequency dual-interface antenna. In another embodiment, the transmission line 16 may be connected between only some resonators, and the transmission line 16 is not connected to the other resonators. For example, when the antenna 1 includes the first resonator 141, the second resonator 142, the fifth resonator 145, and the sixth resonator 146, the transmission line 16 may be connected only between the first resonator 141 and the second resonator 142, and the transmission line 16 is not connected between the fifth resonator 145 and the sixth resonator 146, to form a quad-frequency three-interface antenna.

Figure 12:
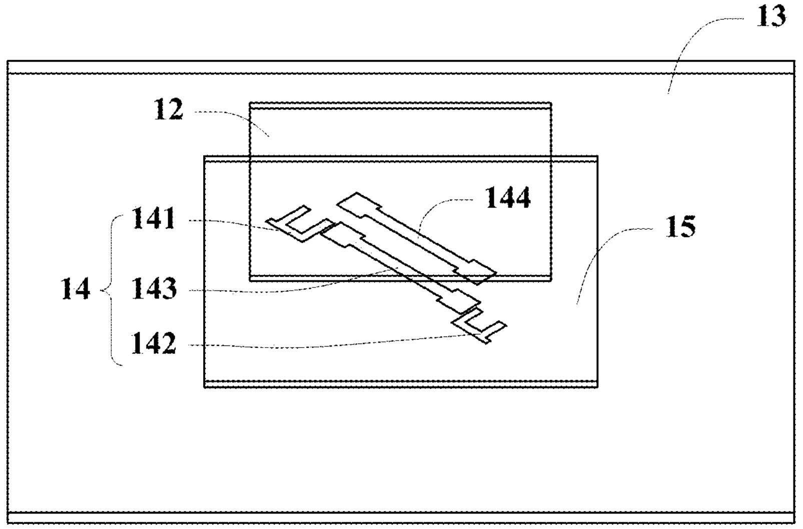
FIG. 12 is a diagram of another partial structure of an antenna according to an embodiment of this application.
Figure 13:
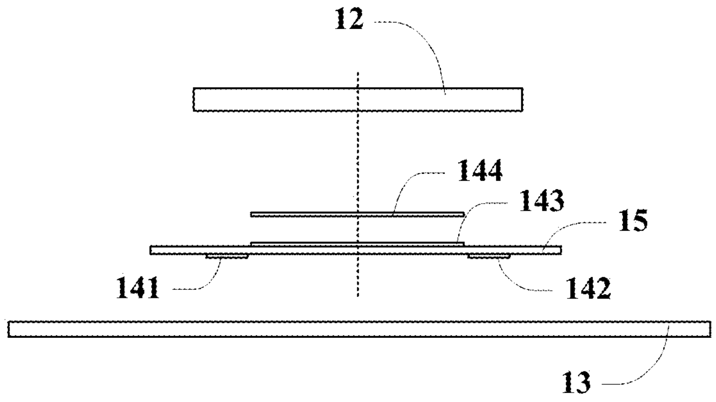
FIG. 13 is another partial lateral sectional view of an antenna according to an embodiment of this application.

FIG. 12 is a diagram of another partial structure of an antenna according to an embodiment of this application. FIG. 13 is another partial lateral sectional view of an antenna according to an embodiment of this application. Refer to FIG. 12 and FIG. 13. In another specific embodiment, the antenna 1 may further include at least one fourth resonator 144. The fourth resonator 144 is located on a side of the third resonator 143 facing the radiating element 12. In other words, the fourth resonator 144 is located between the third resonator 143 and the radiating element 12. Refer to FIG. 12. In an embodiment, when the antenna 1 includes one fourth resonator 144, a side of the fourth resonator 144 is coupled to the third resonator 143, and the other side of the fourth resonator 144 is coupled to the radiating element 12. In this embodiment, the radiating element 12 resonates a signal by using a multi-level resonator, and a coupling degree is low. In this case, sensitivity of the signal is reduced, and the signal is not easily interfered, so that a radiation pattern of the entire antenna 1 is better, and this helps implement better cross-polarization performance in a wider bandwidth.

Figure 14:
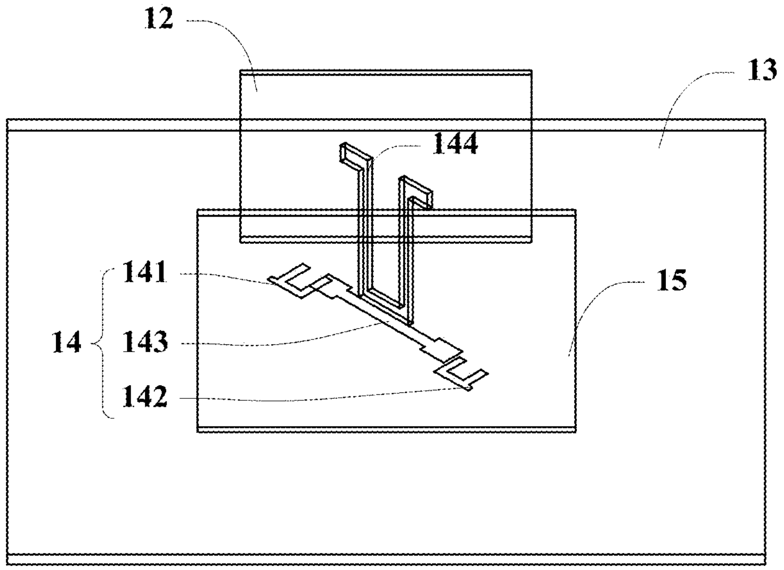
FIG. 14 is a diagram of another partial structure of an antenna according to an embodiment of this application.

FIG. 14 is a diagram of another partial structure of an antenna according to an embodiment of this application. Refer to FIG. 12 to FIG. 14. When the fourth resonator 144 is specifically disposed, the fourth resonator 144 may be disposed in parallel with the third resonator 143, or an extension direction of the fourth resonator 144 is the same as the extension direction of the third resonator 143, as shown in FIG. 12 and FIG. 13. Alternatively, the fourth resonator 144 may extend in the second direction Z. The second direction Z is also the direction perpendicular to the reflection panel 13, as shown in FIG. 14. It may be understood that, the extension direction of the fourth resonator 144 is a direction in which the fourth resonator 144 has a maximum size in a three-dimensional coordinate system.

Figure 15:
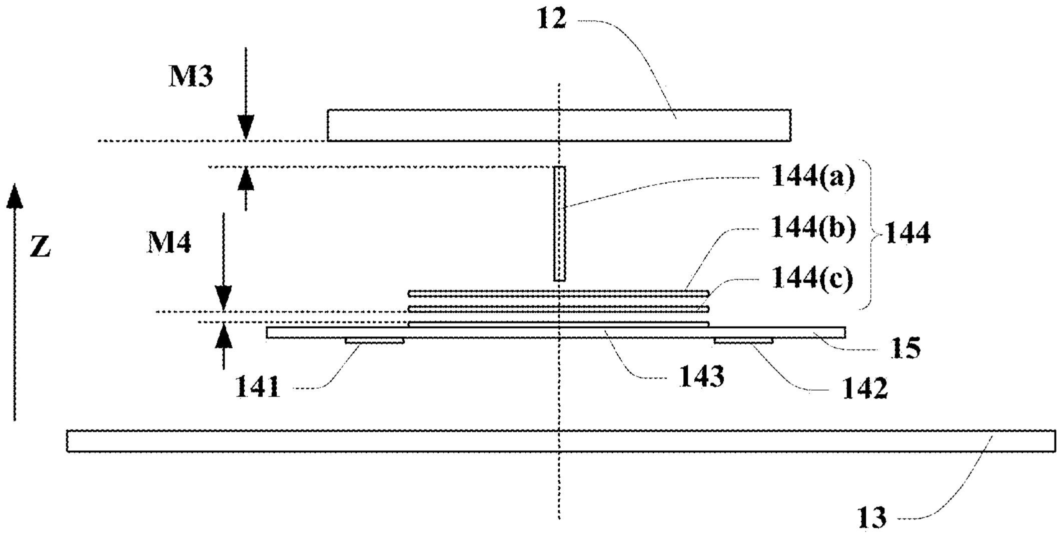
FIG. 15 is another sectional view of a structure of an antenna according to an embodiment of this application.

FIG. 15 is another sectional view of a structure of an antenna according to an embodiment of this application. Refer to FIG. 15. In another specific embodiment, the antenna 1 may include at least two fourth resonators 144 (where for example, the antenna in FIG. 15 includes three fourth resonators 144). The radiating element 12, the at least two fourth resonators 144, and the third resonator 143 are sequentially coupled. To be specific, a fourth resonator 144 adjacent to the radiating element 12 is coupled to the radiating element 12, a fourth resonator 144 adjacent to the third resonator 143 is coupled to the third resonator 143, and any two adjacent fourth resonators 144 are coupled. For example, in the embodiment shown in FIG. 15, the three fourth resonators 144 of the antenna are a fourth resonator 144(*a*), a fourth resonator 144(*b*), and a fourth resonator 144(*c*) in sequence. The radiating element 12 is coupled to the fourth resonator 144(*a*), the fourth resonator 144(*a*) is coupled to the fourth resonator 144(*b*), the fourth resonator 144(*b*) is coupled to the fourth resonator 144(*c*), and the fourth resonator 144(*c*) is coupled to the third resonator 143. A larger quantity of fourth resonators 144 indicates a lower coupling degree, a larger tolerance of each structure, and lower signal sensitivity. This is more beneficial to implement a coupling and optimize a radiation pattern of the entire antenna 1.

When the fourth resonator 144 is specifically disposed, a relationship between an electrical length b of the fourth resonator 144 and the wavelength λ corresponding to the center frequency of the operating frequency band of the radiating element 12 satisfies: $b=\frac{1}{2}\lambda$. The electrical length is a length that is actually used by the fourth resonator 144 to transmit a signal, and is irrelevant to an actual physical length. A concept of the electrical length b herein is the same as the concept of the electrical length a of the third resonator 143. Details are not described herein again. In this solution, a signal transmitted by the radiating element 12 can be transmitted better in the fourth resonator 144.

Refer to FIG. 15. In a specific embodiment, orthographic projection of a center point of the fourth resonator 144 on the reflection panel 13 overlaps the orthographic projection of the center point of the radiating element 12 on the reflection panel 13. It may be understood that "overlapping" is an ideal case in a design process. In an actual manufacturing and application process, the orthographic projection of the center point of the fourth resonator 144 on the reflection panel 13 and the orthographic projection of the center point of the radiating element 12 on the reflection panel 13 may have a specific error, and this also falls within the protection scope of this application. In this solution, signal transmission symmetry can be improved, and communication performance of the antenna 1 can be improved.

In some other embodiments, the orthographic projection of the center point of the third resonator 143 on the reflection panel 13, orthographic projection of a center point of the fourth resonator 144 on the reflection panel 13, and the orthographic projection of the center point of the radiating element 12 on the reflection panel 13 overlap. It may also be understood that "overlapping" is an ideal case in a design process. A specific error, for example, a deviation of approximately 5%, is allowed in an actual manufacturing and application process. Details are not described herein.

Refer to FIG. 15. The fourth resonator 144 is located below the radiating element 12. A distance M3 between a geometric center of a surface of the fourth resonator 144 facing the radiating element 12 and a surface of the radiating element 12 facing the fourth resonator in the second direction Z and the wavelength λ corresponding to the center frequency of the operating frequency band of the radiating element 12 satisfy: $M3\leq\frac{1}{10}\lambda$. In this solution, the antenna 1 can obtain a good pattern. In addition, this helps increase a bandwidth that can be used by the antenna 1 to propagate a signal, and transmission of a signal of a high frequency band is facilitated. It should be noted that, in this application, when the antenna 1 includes a plurality of fourth resonators 144, as shown in FIG. 15, the distance M3 is a distance M3 between the radiating element 12 and a fourth resonator 144 that is in the plurality of fourth resonators 144 and that is adjacent to (closest to) the radiating element 12 in the second direction Z.

Still refer to FIG. 15. In some other embodiments, a distance M4 between a geometric center of a surface of the fourth resonator 144 facing the third resonator 143 and a surface of the third resonator 143 facing the fourth resonator 144 in the second direction Z and the wavelength λ corresponding to the center frequency of the operating frequency band of the radiating element 12 satisfy: $M4\leq\frac{1}{20}\lambda$. In this solution, a coupling degree between the third resonator 143 and the fourth resonator 144 is improved. It should be noted that, in this application, when the antenna 1 includes a plurality of fourth resonators 144, as shown in FIG. 15, the distance M4 is a distance M4 between the third resonator 143 and a fourth resonator 144 that is in the plurality of fourth resonators 144 and that is adjacent to (closest to) the third resonator 143 in the second direction Z.

Figure 16:
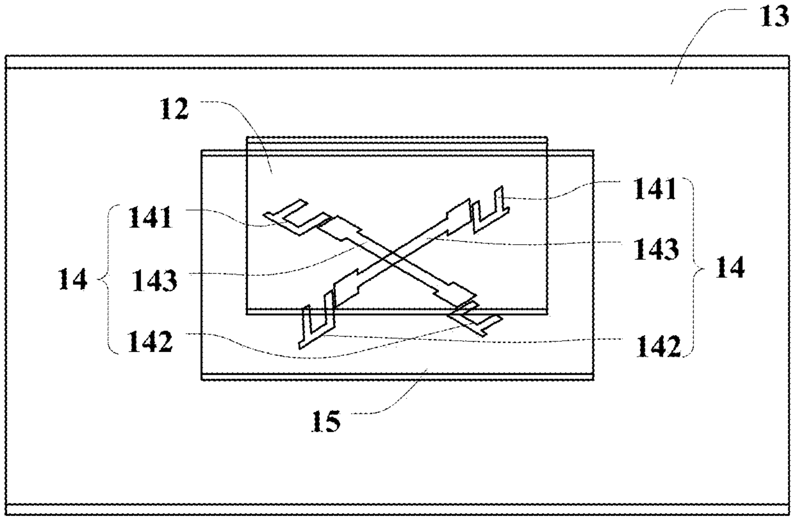
FIG. 16 is a diagram of another partial structure of an antenna according to an embodiment of this application.

In embodiments in the foregoing accompanying drawings, an example in which the radiating element 12 is a single-polarization radiating element 12 is used for description. The following describes, with reference to an accompanying drawing, an implementation when the radiating element 12 in the technical solutions of this application is a dual-polarization radiating element. FIG. 16 is a diagram of another partial structure of an antenna according to an embodiment of this application. In another embodiment, the radiating element 12 may alternatively be a dual-polarization radiating element 12. Specifically, the radiating element 12 may include a first polarization direction and a second polarization direction, and the first polarization direction intersects with the second polarization direction. In this case, the antenna 1 includes two resonator groups 14, and the two resonator groups 14 are in one-to-one correspondence with the two polarization directions. Specifically, in the two resonator groups 14, an extension direction of a third resonator 143 in one resonator group 14 is the same as the first polarization direction, and an extension direction of a third resonator 143 in the other resonator group 14 is the same as the second polarization direction. In this solution, the two resonator groups 14 may be used to transmit signals in the two polarization directions of the radiating elements 12 respectively. A person skilled in the art may obtain, according to the technical solutions in the foregoing embodiments, a technical solution in a scenario in which the radiating element 12 has dual polarization directions or a circular polarization direction or another scenario without extra efforts with reference to the descriptions in FIG. 16.

In addition, polarization directions in the accompanying drawings in embodiments of this application are all 45° polarization. However, the polarization direction is not limited in this application. For example, the polarization direction may be 0° polarization or 90° polarization. In conclusion, a polarization manner of the radiating element 12 is not limited in this application.

Terms used in the foregoing embodiments are merely intended to describe specific embodiments, and are not intended to limit this application. As used in the specification and the appended claims of this application, the singular expressions "a/an", "one", "said", "the foregoing", "the", and "this" are intended to also include such expressions as "one or more", unless otherwise clearly indicated in the context.

Reference to "an embodiment" or "a specific embodiment" or the like described in the specification means that one or more embodiments of this application include a specific feature, structure, or characteristic described with reference to this embodiment. The terms "include", "have", and their variants all mean "include but are not limited to", unless otherwise specifically emphasized in another manner.

The foregoing embodiments may be independent embodiments, or may be combined. For example, technical features in at least two of embodiments are combined to form a new embodiment. This is not limited in this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna, comprising a reflection panel, a radiating element, and a resonator group, wherein:

the resonator group is disposed between the reflection panel and the radiating element;

the resonator group comprises a first resonator, a second resonator, and a third resonator, the third resonator has a first connection portion and a second connection portion, the first connection portion and the second connection portion are located at at least one open-circuit end of the third resonator, the first resonator is coupled to the first connection portion, the second resonator is coupled to the second connection portion, and the third resonator is coupled to the radiating element;

the first resonator is configured to transmit a signal in a first frequency band, the second resonator is configured to transmit a signal in a second frequency band, and the first frequency band is different from the second frequency band;

when the antenna transmits a signal, the third resonator:

receives the signal in the first frequency band from the first resonator;

receives the signal in the second frequency band from the second resonator;

combines the signal in the first frequency band and the signal in the second frequency band into one channel of signal; and sends the channel of signal to the radiating element; and when the antenna receives a signal, the third resonator:

splits the signal received by the radiating element into the signal in the first frequency band and the signal in the second frequency band;

sends the signal in the first frequency band to the first resonator; and sends the signal in the second frequency band to the second resonator.

2. The antenna according to claim 1, wherein the radiating element is a dual-polarization radiating element, the dual-polarization radiating element comprises a first polarization direction and a second polarization direction, the antenna comprises two resonator groups, and third resonators in the two resonator groups extend in the first polarization direction and the second polarization direction respectively.

3. The antenna according to claim 1, wherein orthographic projection of a center point of the third resonator on the reflection panel overlaps orthographic projection of a center point of the radiating element on the reflection panel.

4. The antenna according to claim 1, wherein an electrical length a of the third resonator and a wavelength λ corresponding to a center frequency of an operating frequency band of the radiating element satisfy: $a=\frac{1}{2}\lambda$.

5. The antenna according to claim 1, wherein a length L1 of an open-circuit end in the at least one open-circuit end in a first direction and a length L of the third resonator in the first direction satisfy: $L1\leq\frac{1}{8}L$, and the first direction is an extension direction of the third resonator.

6. The antenna according to claim 1, wherein a distance M1 between the third resonator and the radiating element in a second direction and a wavelength λ corresponding to a center frequency of an operating frequency band of the radiating element satisfy: $M1\leq\frac{1}{4}\lambda$, and the second direction is perpendicular to the reflection panel.

7. The antenna according to claim 1, wherein a distance M2 between the third resonator and the reflection panel in a second direction and a wavelength λ corresponding to a center frequency of an operating frequency band of the radiating element satisfy: $M2\leq\frac{1}{10}\lambda$, and the second direction is perpendicular to the reflection panel.

8. The antenna according to claim 1, wherein a distance M1 between the third resonator and the radiating element in a second direction and a distance M2 between the third resonator and the reflection panel in the second direction satisfy: $M2<M1$, and the second direction is perpendicular to the reflection panel.

9. The antenna according to claim 1, further comprising at least one fourth resonator, wherein the at least one fourth resonator is located on a side of the third resonator facing the radiating element, and wherein:

when the antenna comprises one fourth resonator, a side of the fourth resonator is coupled to the third resonator, and another side of the fourth resonator is coupled to the radiating element; or when the antenna comprises a plurality of fourth resonators, a fourth resonator adjacent to the third resonator is coupled to the third resonator, a fourth resonator adjacent to the radiating element is coupled to the radiating element, and any two adjacent fourth resonators are coupled.

10. The antenna according to claim 9, wherein orthographic projection of a center point of the fourth resonator on the reflection panel overlaps the orthographic projection of the center point of the radiating element on the reflection panel.

11. The antenna according to claim 9, wherein the fourth resonator extends in a second direction, and the second direction is perpendicular to the reflection panel.

12. The antenna according to claim 9, wherein an electrical length b of the fourth resonator and a wavelength λ corresponding to a center frequency of an operating frequency band of the radiating element satisfy: $b=\frac{1}{2}\lambda$.

13. The antenna according to claim 1, further comprising a transmission line, wherein the transmission line is connected between the first resonator and the second resonator, and the transmission line is connected to an input/output port of the antenna.

14. The antenna according to claim 1, wherein the third resonator has a sheet-like structure or a three-dimensional structure.

15. A base station, comprising a mounting support and an antenna installed on the mounting support, wherein the antenna comprises a reflection panel, a radiating element, and a resonator group, and wherein:

the resonator group is disposed between the reflection panel and the radiating element;

the resonator group comprises a first resonator, a second resonator, and a third resonator, the third resonator has a first connection portion and a second connection portion, the first connection portion and the second connection portion are located at at least one open-circuit end of the third resonator, the first resonator is coupled to the first connection portion, the second resonator is coupled to the second connection portion, and the third resonator is coupled to the radiating element;

the first resonator is configured to transmit a signal in a first frequency band, the second resonator is configured to transmit a signal in a second frequency band, and the first frequency band is different from the second frequency band;

when the antenna transmits a signal, the third resonator:

receives the signal in the first frequency band from the first resonator;

receives the signal in the second frequency band from the second resonator;

combines the signal in the first frequency band and the signal in the second frequency band into one channel of signal; and sends the channel of signal to the radiating element; and when the antenna receives a signal, the third resonator:

splits the signal received by the radiating element into the signal in the first frequency band and the signal in the second frequency band;

sends the signal in the first frequency band to the first resonator; and sends the signal in the second frequency band to the second resonator.

16. The base station according to claim 15, wherein the radiating element is a dual-polarization radiating element, the dual-polarization radiating element comprises a first polarization direction and a second polarization direction, the antenna comprises two resonator groups, and third resonators in the two resonator groups extend in the first polarization direction and the second polarization direction respectively.

17. The base station according to claim 15, wherein orthographic projection of a center point of the third resonator on the reflection panel overlaps orthographic projection of a center point of the radiating element on the reflection panel.

18. The base station according to claim 15, wherein an electrical length a of the third resonator and a wavelength $\lambda$ corresponding to a center frequency of an operating frequency band of the radiating element satisfy: $a=\frac{1}{2}\lambda$.

19. The base station according to claim 15, wherein a length L1 of an open-circuit end in the at least one open-circuit end in a first direction and a length L of the third resonator in the first direction satisfy: $L1\leq\frac{1}{8}L$, and the first direction is an extension direction of the third resonator.

20. The base station according to claim 15, wherein a distance M1 between the third resonator and the radiating element in a second direction and a wavelength $\lambda$ corresponding to a center frequency of an operating frequency band of the radiating element satisfy: $M1\leq\frac{1}{4}\lambda$, and the second direction is a direction perpendicular to the reflection panel.

* * * * *